United States Patent Office 2,901,943
Patented Sept. 1, 1959

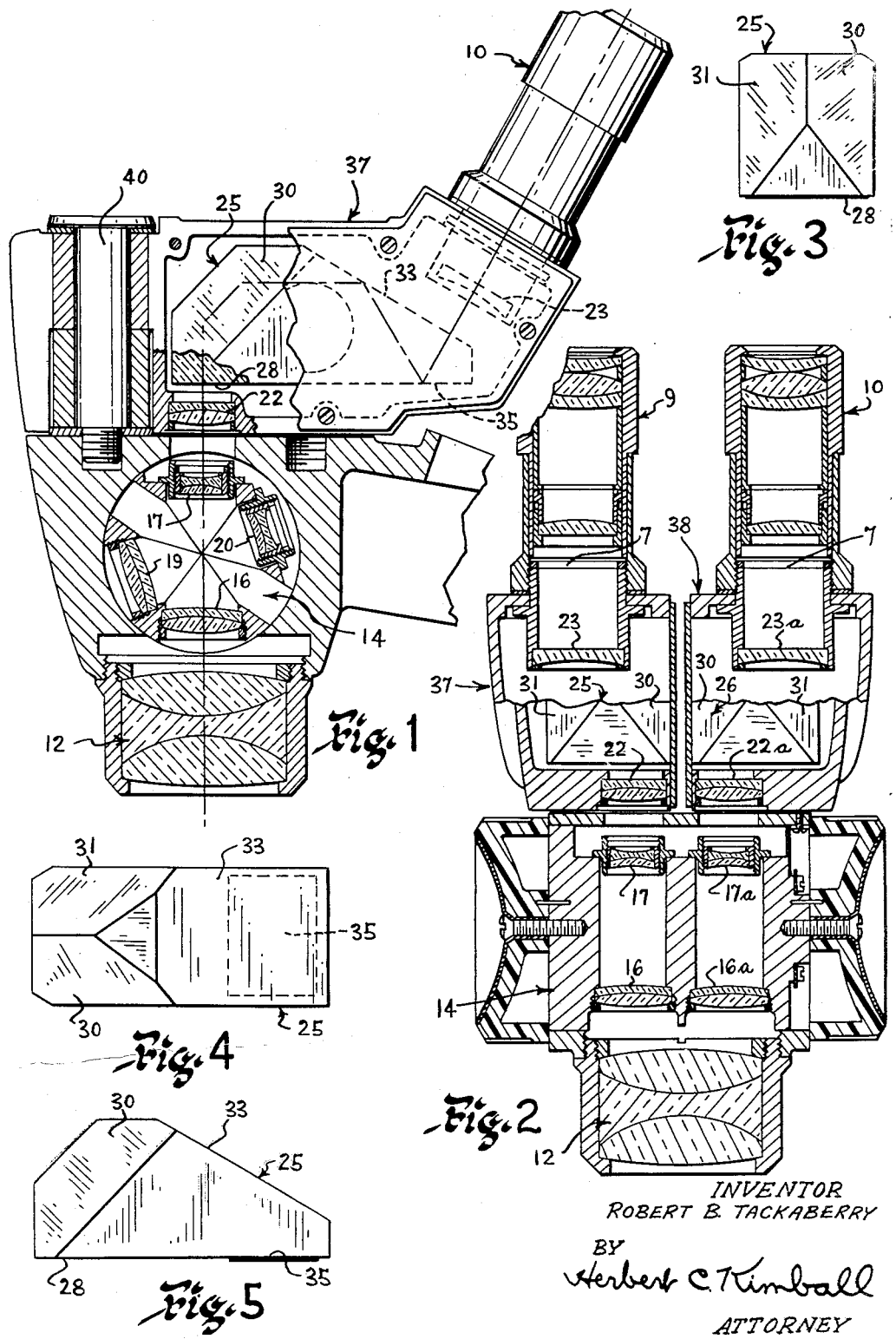

2,901,943

STEREOSCOPIC MICROSCOPE

Robert B. Tackaberry, Tonawanda, N.Y., assignor to American Optical Company, Southbridge, Mass., a voluntary association of Massachusetts Application September 5, 1956, Serial No. 608,016

3 Claims. (Cl. 88—39)

This invention relates to the stereoscopic viewing of minute details of an object under observation. Normal vision is binocular, the two images being fused together without conscious effort. When an object is viewed through a binocular stereoscopic microscope the eyes may labor to obtain stereopsis unless the two images are properly related.

One source of difficulty has arisen through the necessary variation in interpupillary distance between the eyepieces which accomodates corresponding differences between observers. As the eyepieces are swung outwardly the images are slightly rotated, one clockwise and the other counterclockwise, thereby placing some strain on the eyes to fuse the two images. To overcome this, I have introduced a deviation from 90° in the dihedral angle of each of the two erecting prisms which position the images viewed by the eyepieces. Taking into consideration an average of the displacement of the eyepieces to accommodate varying interpupillary distances, I have made the above-mentioned deviation an amount which compensates the average rotation of the image.

This improvement is illustrated by an example found in the drawings in which:

Fig. 1 is a side view, principally in vertical section, of the optics of a stereoscopic microscope;

Fig. 2 is a transverse section of the microscope taken substantially along the optical axis shown in Fig. 1;

Fig. 3 is an end view of one of the erecting prisms;

Fig. 4 is a top plan of the prism;

Fig. 5 is an elevation of the prism.

In the stereoscopic microscope selected to illustrate my invention, the objective lens system in connection with a pair of erecting prisms later to be described will form in the image plane 7 a pair of spaced images of the object being observed. A pair of eyepieces 9 and 10 magnify this image for the observer.

The objective lens system which produces the pair of spaced images may be a dual system with the two branches focused on the same object. A simple form is shown in the patent to H. N. Ott, No. 1,167,425, issued January 11, 1916. Some economy is effected by using a central objective 12 common to the two branches. In the embodiment shown, this central objective 12 is the only lens common to the two branches of the system.

To impart greater flexibility by way of a choice between different magnifications which can be obtained with the instrument I introduce a pair of Galilean systems in the two brances, although my invention is equally applicable to the simpler instrument without this flexibility. As shown, a turret or head 14 carries two or more Galilean systems with different magnification effect; and to bring about changes to different magnifications, the head 14 is rotated to bring into optical alignment with the axis of the central objective 12 other "positions" of the head 14. As shown in Fig. 1 a Galilean system (for instance a 2× system) is aligned with objective 12 and includes a front doublet 16 and a rear doublet 17. (The doublets for the other branch will be 16a and 17a.) A second Galilean system constituting a different "position" of the head 14 may be turned into alignment with objective 12, this system including a front doublet 19 and a rear doublet 20 (the doublets for the other branch will be 19a and 20a). A third "position" of the head 14 may be merely an opening through the head, as the image plane remains at 7 due to the design of objective 12 to collimate the light passed to the Galilean systems.

While the magnification afforded by the microscope depends upon which position of the head 14 is used, the light reaching element 22 (or 22a for the other branch) will in all cases be parallel light. In this particular system this element 22 (or 22a) is a convergent doublet and together with the negative element 23 (or 23a) on the other side of the erecting prism forms a telescope objective producing in the plane 7 an image of the object under observation.

As previously referred to, the images are erected and positioned so as to be viewed by the eyepieces 9 and 10 by a pair of prisms 25 and 26, one of which is shown in Figures 3, 4 and 5. The prism design admits light from the doublet 22 or 22a perpendicularly through the face 28 and in alignment with one side 30 of the modified roof reflecting surface (not in alignment with the ridge of the roof). The light is then reflected to the other side 31 of the modified roof reflecting surface and then to the face 33. From here is is reflected downwardly to a portion 35 of the face 28.

This portion 35 is a mirror surface (for instance silvered) which reflects the light perpendicularly through the face 33.

As previously explained the dihedral angle between the sides 30 and 31 of the modified roof surface is approximately 90°, the deviation from 90° causing a slight rotation of the image. The prisms 25 and 26 together with the eyepieces 9 and 10 are mounted in or on a pair of housings 37 and 38 which are pivoted to the microscope on a stud 40. Swinging the housings 37 and 38 on the common pivot away from each other affords a wider inter-pupillary distance. At the same time the images are rotated, but in a direction opposite to the rotation caused by the above-mentioned deviation of the dihedral angle. The two off-set each other, and therefore such deviation of the dihedral angle from 90° is preferably selected which takes care of an average separation of the eyepieces. No degradation of the image is caused by this deviation because the optical path is offset from the ridge of the roof, being reflected from first one side and then the other. For the conditions present in the instrument which is illustrated in the drawings a roof angle of 90° 18′ compensates for the average spacing of the eyepieces, but the dimensions of the parts including the housings 37 and 38 are factors in determining the desirable deviation, which can readily be determined by a lens designer for instruments with other dimensions.

Focusing mechanism for adjusting the focus of such a microscope as shown in the drawings is disclosed and claimed in my copending application Serial No. 604,411, filed August 16, 1956.

The present invention improves the comfort of the observer without detriment to the quality of the two images, and improved results are obtained by incorporating the same in the design of a stereoscopic microscope.

I claim:

1. In a stereoscopic microscope the combination with a microscope lens system having a pair of objectives with axes offset with relation to each other for forming a pair of spaced stereoscopic images of the object being viewed, one image for each eye of the observer, and a pair of eyepieces for viewing said spaced images each of said eyepieces having its axis inclined with respect to the axis of the objective which forms its respective image, of a pair of erecting prisms one interposed between each eyepiece and its respective objective and each having reflecting surfaces for inverting and directing the image forming light rays from said objective into its respective eyepiece and each having a modified roof reflecting surface for reversing said image forming light rays, one side of said modified roof reflecting surface being aligned with the axis of its respective objective and the other side being aligned with the axis of its respective eyepiece, each eyepiece together with its respective erecting prism being pivotally mounted in common to swing about the optical path through its respective objective and bring about adjustment of the interpupillary distance of the observer, the ridge of each modified roof reflecting surface being inclined at the same obtuse angle to the axle of its respective objective with the dihedral angle deviating from 90° substantially by the amount required to compensate for the rotation of the image brought about by an average interpupillary distance of observers.

2. In a stereoscopic microscope, the combination with a microscope lens system having a pair of objectives with axes offset with relation to each other for forming a pair of spaced stereoscopic images of the object being viewed, one image for each eye of the observer, and a pair of eyepieces for viewing said spaced images, each of said eyepieces having its axis inclined with respect to the axis of the objective which forms its respective image, of a pair of erecting prisms one interposed between each eyepiece and its respective objective and each having a modified roof reflecting surface together with a rear reflecting surface for receiving light from said modified roof surface and reflecting it within the prism and a bottom reflecting surface for directing the said light in turn to its respective eyepiece, one side of said modified roof reflecting surface being aligned with the axis of its respective objective and the other side being aligned with its respective eyepiece, each eyepiece and its respective erecting prism being pivotally mounted in common to swing about the optical path through its respective objective and bring about adjustment of the interpupillary distance of the observer, the ridge of each modified roof reflecting surface being inclined at the same obtuse angle to the axis of its respective objective, with the dihedral angle deviating from 90° substantially by the average amount required to compensate for the rotation of the image brought about by changes in separation of the eyepieces.

3. In a stereoscopic microscope, the combination with a microscope lens system having an objective focussing at infinity and a pair of telescope objectives cooperating therewith to form stereoscopic images of an object being observed, and a pair of eyepieces for viewing said images, each of said eyepieces having its axis inclined with respect to the axis of the telescope objective which forms its respective image, of a pair of erecting prisms one interposed between each eyepiece and its respective objective and each having reflecting surfaces for inverting and directing the image forming light rays from said objective into its respective eyepiece and each having a modified roof reflecting surface for reversing said image forming light rays, one side of said modified roof reflecting surface being aligned with the axis of its respective telescope objective and the other being aligned with the axis of its respective eyepiece, each eyepiece and its respective erecting prism being pivotally mounted in common to swing about the optical path through its respective telescope objective and bring about adjustment of the interpupillary distance of the observer, the ridge of each modified roof reflecting surface being inclined at the same obtuse angle to the axis of its respective telescope objective with the dihedral angle deviating from 90° substantially by the amount required to compensate for the rotation of the image brought about by an average interpupillary distance of observers.

References Cited in the file of this patent

UNITED STATES PATENTS

| | | |
|---|---|---|
| 1,501,059 | Metz | July 15, 1924 |
| 2,058,676 | Foster | Oct. 27, 1936 |
| 2,087,329 | Ott | July 20, 1937 |
| 2,288,619 | Gardner | July 7, 1942 |
| 2,625,853 | Hayward | Jan. 20, 1953 |